US006971149B2

(12) United States Patent
Berman et al.

(10) Patent No.: US 6,971,149 B2
(45) Date of Patent: Dec. 6, 2005

(54) AUTOMOTIVE WHEEL ASSEMBLY REMOVAL APPARATUS

(75) Inventors: Theodore J. Berman, Maria Stein, OH (US); John C. Huelsman, Maria Stein, OH (US); Jon E. Bergman, Maria Stein, OH (US)

(73) Assignee: West Central Ohio Tool Distributors, Ltd., Maria Stein, OH (US)

( * ) Notice: Subject to any disclaimer, the term of this patent is extended or adjusted under 35 U.S.C. 154(b) by 0 days.

(21) Appl. No.: 10/027,371

(22) Filed: Dec. 20, 2001

(65) Prior Publication Data

US 2003/0115731 A1 Jun. 26, 2003

(51) Int. Cl.[7] .............................................. B23P 19/04
(52) U.S. Cl. ...................................................... 29/254
(58) Field of Search .......................... 29/254, 255, 275, 29/264, 263, 265, 266, 281.1, 282, 283

(56) References Cited

U.S. PATENT DOCUMENTS

| | | | | |
|---|---|---|---|---|
| 2,377,304 A | | 6/1945 | Appel | |
| 2,779,089 A | | 1/1957 | Allen | |
| 3,003,230 A | | 10/1961 | Fornes | |
| 3,106,012 A | * | 10/1963 | Comer | 29/254 |
| 4,185,372 A | | 1/1980 | Dupree et al. | |
| 4,283,827 A | * | 8/1981 | Abel | 29/254 |
| 4,675,968 A | * | 6/1987 | Bartlett | 29/254 |
| 4,733,450 A | * | 3/1988 | Pool | 29/254 |
| 4,831,904 A | | 5/1989 | Agins | |
| 4,875,395 A | | 10/1989 | Alvarez | |
| 4,884,611 A | | 12/1989 | Schmidt | |
| 5,716,107 A | | 2/1998 | Parker et al. | |
| 5,850,679 A | | 12/1998 | Hoffman | |
| 5,887,666 A | | 3/1999 | Chen et al. | |
| 5,991,994 A | | 11/1999 | Crews | |

* cited by examiner

*Primary Examiner*—Robert C. Watson
(74) *Attorney, Agent, or Firm*—Sean M. Casy; Stevens Davis Miller Mosher LLP

(57) ABSTRACT

A wheel assembly removal apparatus for use in the automotive maintenance and repair industry. The apparatus is adapted to remove a seized wheel assembly, and associated components, from a vehicle chassis for maintenance and repair while minimizing time and cost, and the possibility for damage. The wheel assembly removal apparatus preferably incorporates, among other elements, a slide hammer assembly that includes a hammer secured to a hollow slide tube. The hollow slide tube is received on a slide shaft. The slide shaft also preferably incorporates a hammer stop near a distal end and a distally projecting support extension. A coupler is formed at a proximal end of the slide shaft and is configured to releasably engage an interchangeable rotor securing tool. The interchangeable rotor securing tool releasably attaches to the coupler at the distal end and to a rim mounting surface at the proximal end. In operation, the slide hammer assembly is accelerated from the proximal end of the slide shaft to impact with the hammer stop, which creates linear momentum transfer in the form of an operational impact load. The impact load is transferred to the wheel assembly to break free the various components that may be seized together from the accumulation of dirt, dust, moisture, and corrosion. The apparatus includes at least one releasably engagable retainer assembly to loosely retain the wheel assembly to the vehicle chassis for controlled separation of the seized components. The apparatus may also preferably include a dual hand operation mechanism.

24 Claims, 4 Drawing Sheets

AUTOMOTIVE WHEEL ASSEMBLY REMOVAL APPARATUS

TECHNICAL FIELD

This invention relates to tools and particularly to a tool adapted to remove a wheel assembly from a vehicle chassis for automotive maintenance and repair. More specifically, the invention relates to a durable, inexpensive, and reconfigurable apparatus for removal of the wheel assembly from the vehicle chassis of a plurality of original equipment manufacturer (hereafter also referred to as "OEM") product lines

BACKGROUND OF THE INVENTION

In the various automotive vehicle industries, including for purposes of illustration but not limitation, wheel and brake servicing and repair, those with skill in the art have long-recognized the need for an improved method of removing the various components of a wheel assembly without damage, including, for example, the rotors, hubs, bearings, spindles, and axles.

In the past, mechanics have had to resort to blow torches, mallets, hammers, and the like to remove and break free the various components that may be seized together from the accumulation of dirt, dust, moisture, and corrosion. Such seizing is further exacerbated by the combined effect of heavy load conditions experienced by many types of commercial, industrial, and military vehicles. Some mechanics also attempt to pull the assembly apart by securing pulling devices to one of the wheel assembly engagement members, typically referred to as studs or lugs by those having skill in the art. This method does not evenly distribute the pulling forces to the wheel assembly and often results in damage to the engagement members and the wheel assembly, which can require replacement parts and increased maintenance costs. Occasionally, vehicle manufacturers will suggest alternative removal methods including, for example, the installation of longer bolts or studs from the rear of the assembly that operate to force apart the assembly from the spindle or axle. However, this method is generally ineffective to combat severely corroded parts and is generally incompatible for use with most OEM vehicle configurations such as, for example, four-wheel drive vehicles that incorporate complex axle locations. As a result of such difficulty and in light of the expense and ineffectiveness of most prior art devices, mechanics generally resort to the hammer and mallet methods typically impart unevenly applied impact forces, which often damage the hub, rotor, bearings, axle, and spindle.

As noted above, the problem of seized wheel assembly components is especially common in load carrying vehicles. Removing the seized components of load carrying vehicles can take dozens of forceful hammer blows to the rotor, and often requires the use of a torch. This traditional removal technique is dangerous, time consuming, exhausting, and potentially damaging to the components that require removal and servicing. Any service facility will expend several man-hours each day removing these components and cannot avoid irreparable damage to components during removal, the costs of which are born in part by the facility and which must in most part be passed on to the customer.

What has been needed but as yet unavailable is a device that addresses some of the long-standing problems in the art. Some attempts have been made to improve devices for use in other technology areas. For example, the value of a slide hammer type device in imparting tensile impulse loads has been attempted in the automotive services industry. Prior art devices and methods for applying tensile impulse loads have not been compatible for wide spread uses and do not properly impart effective and efficient axial forces. For example, in U.S. Pat. No. 3,106,012 to Comer and U.S. Pat. No. 3,003,230 to Fornes, slide hammer devices were incorporated in axle pullers. Even earlier, U.S. Pat. No. 2,377,304 to Appel incorporated a slide hammer into a device for pulling sleeves from internal combustion engines. More recently, U.S. Pat. No. 4,283,827 to Abel utilized a slide hammer device in a tool for removing axle spindles. While these devices attempt to impart effective tensile impulse loads on the object intended to be pulled, none of the attempts to date have offered the safe, reliable, and novel aspects contemplated by the present invention, nor have they been compatible for use with the myriad OEM vehicles and components presently in the marketplace.

The need remains for an apparatus that can be easily setup and reconfigured to ensure substantially axial transfer of generally uniform forces, that can be utilized on a variety of vehicles, and that can safely remove a corroded wheel assembly, while minimizing or eliminating potential damage to the assembly during unseizing and separation. While many of the prior art devices were aimed to improve the art of such devices, none has achieved the optimized and effective capabilities and widespread compatibility of the instant invention.

The present invention meets the above described and other needs without adding any complexity, inefficiencies, or significant costs to implementation in existing applications and environments. In fact, the preferred apparatus according to the present invention can be implemented with relatively low-cost materials and components that can be easily adapted according to the principles of the present invention. The various embodiments of the present invention disclosed are readily adapted for preferable ease of manufacture, low fabrication and setup costs, effectiveness of operation, and for wide compatibility with various OEM components.

SUMMARY OF INVENTION

In its most general configuration, the present invention advances the state of the art with a variety of new capabilities and overcomes many of the shortcomings of prior devices in new and novel ways. In one of the many preferable configurations, the wheel assembly removal apparatus incorporates, among other elements, a slide hammer assembly that includes a hammer secured to a hollow slide tube. The hollow slide tube receives a slide shaft upon which the hollow slide tube and hammer can be moved. The slide shaft incorporates a hammer stop near the distal end and a distally projecting support extension. A coupler is formed at the proximal end of the slide shaft and is configured to releasably engage an interchangeable rotor securing tool. The interchangeable rotor securing or connecting tool releasably attaches to the coupler at the distal end and to a rim mounting surface at the proximal end. The term "interchangeable rotor securing tool" used throughout contemplates embodiments adapted to attach to a variety of differently configured wheel rim mounting surfaces, including wheel hubs, rotors, and other wheel assembly components and combinations thereof.

In operation, a user rapidly accelerates the hammer and slide tube, also referred to as the slide hammer assembly, from the proximal end of the slide shaft to impact the hammer stop, which creates an operational impact load when the hammer strikes the hammer stop and the linear momentum of the hammer is transferred to the shaft through the stop. The impact load is transferred through the slide shaft, the coupler, and the interchangeable rotor securing tool to the rim mounting surface, rotor, or other wheel assembly component. The impact load breaks loose the seized components of the wheel assembly, which may include, for example, wheel bearings, hub, rotor, can axle components, from the spindle and axle.

In one of many variations of the instant invention, the apparatus includes a plurality of engagement hole patterns, each containing at least two engagement holes formed on the interchangeable rotor securing tool. More specifically, one embodiment of the interchangeable rotor securing tool may preferably include a four engagement hole pattern, a six engagement hole pattern, an eight engagement hole pattern on a single tool, and combinations thereof. Alternatively, the interchangeable rotor securing tool may include a three engagement hole pattern, a five engagement hole pattern, an eight engagement hole pattern on a single tool, and combinations thereof. Alternatively, each of the plurality of engagement hole patterns may be formed on individual interchangeable rotor securing tools. These engagement hole patterns are not limited to aligning with engagement members, but may also align with the bearing removal bolt patterns of many vehicles. Such engagement members can include OEM wheel lugs as well as fasteners inserted through holed formed in the wheel assembly.

The coupler is adapted to enable a single slide hammer assembly to be used with any number of interchangeable rotor securing tools for enhancing compatibility. Therefore, one slide hammer assembly may be used with any number of interchangeable rotor securing tools, which can be adapted for both foreign and domestic vehicles, including for example cars, trucks, vans, buses, aircraft, and recreation and military vehicles. The coupler may take the form of a male threaded connection on the slide shaft for engagement by a female threaded receiver on the interchangeable rotor securing tool. Alternatively, one with skill in the art can recognize that the coupler may be formed to include quick release type fasteners, cotter pin type fasteners, bayonet fasteners, and any number of other recognized joining methods.

Additional embodiments of the interchangeable rotor securing tool are adapted so that the tool can be securely coupled to the rim mounting surface to transfer a substantially axial impact load approximately uniformly to the rim mounting surface. This modification may be used with any of the preceding embodiments and incorporates an interchangeable rotor securing tool that is adapted to be in contact with a substantial portion of the rim mounting surface, rather than being limited to engaging only one engagement member. Then, with the engagement members received through one of the engagement hole patterns and fastened to the tool, the slide shaft is preferably applied to be approximately orthogonal to the rim mounting surface and will transfer substantially axial operational impact loads. While it is preferably that all the engagement members be fastened to the tool to maximize the load distribution and minimize the potential for damaging the engagement members, the apparatus can function when fastened to at least one engagement member. Additionally, the substantial amount of contact area between the rim mounting surface and the tool, when properly connected, ensures a substantially distributed load transfer interface for the uniform transfer of separation impact loads from the tool to the rim mounting surface.

Further, the apparatus also preferably can include a support extension at the distal end of the slide shaft. The support extension allows the operator to rest the distal end of the apparatus on a support device during setup and operation, such as a jack stand. Therefore, the operator does not have to support the weight of the apparatus during setup or while in use. Additionally, with the support extension on a jack stand, the operator can ensure that the slide shaft is generally orthogonal to the plane of the rim mounting surface to maximize kinetic energy and load transfer efficiency. An additional variation of the support extension may include a distal end connection for securing additional tools. The apparatus may then be used as a tool to impart compressive impulse forces.

A further variation of any of the preceding embodiments may also include a dual hand operation mechanism. The mechanism requires that both of the operator's hands be on the moving portion of the apparatus, namely the hollow slide tube and hammer, prior to allowing the moving portion to slide on the slide shaft. This mechanism minimizes the possibility of the operator getting a hand caught between the hammer and the hammer stop.

Any of the preceding configurations and embodiments may also be adapted to include any one of a number of releasably engagable retainer assemblies. The retainer assembly loosely retains the wheel assembly to the vehicle chassis so that the operator, apparatus, and the wheel assembly are controlled when the impact load breaks free the seized components. The retainer assembly may in one variation include at least one fastener. One such embodiment incorporates at least one retainer bolt that loosely secures the wheel assembly to the vehicle chassis during operation. For example, in one of many possible applications in the example of commercial truck vehicles, the OEM bolts that used to tightly secure the bearing of the wheel assembly to the steering knuckle or chassis are removed and replaced with extra long bolts, such as bolts that are approximately 2" to 8", or longer as needed, which enable allow the wheel assembly to break free when the impact load is applied while being loosely connected to the vehicle chassis. Further, the retainer bolts restrain the wheel assembly and apparatus to the vehicle to control the breakaway of the wheel assembly from the vehicle and prevent the wheel assembly and the apparatus from dropping to the ground.

Additionally, further embodiments of the releasably engagable retainer assembly incorporates at least one flexible and adjustable retainer device. The flexible and adjustable retainer device may preferably include chains, wire ropes, elastomeric restraints, bungees, and any number of strap like devices. These flexible and adjustable retainer devices may be releasably engaged by the interchangeable rotor securing tool or the slide shaft and may be wrapped around and through the wheel assembly chassis mount, steering knuckle, or virtually any vehicle chassis member that is securely attached to the vehicle frame.

Any of the preceding configurations and embodiments may also be adapted to include a means for attaching the releasably engagable retainer assembly to the apparatus when not in use. One such embodiment may include retainer bolt recesses formed into the hammer stop in which the retainer bolts may be secured when the apparatus is not in use. Additional embodiments may include retainer bolt recesses in the hammer, interchangeable rotor securing tool, or the device support extension. Similar attachment means may be incorporated into the flexible adjustable retainer device embodiments.

These variations, modifications, and alterations of the various preferred embodiments may be used either alone or in combination with one another as can be better understood by those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures, wherein like reference numerals across the several drawings, figures, and views refer to identical, corresponding, and or equivalent elements, features, components, and parts:

Also, in the various figures and drawings, the following reference symbols and letters are ids used to identify significant features, dimensions, objects, and arrangements of elements described herein below in connection with the several figures and illustrations: A, WA, SK, R, M, and JS.

DESCRIPTION OF THE PREFERRED EMBODIMENT

The wheel assembly removal apparatus according to the present invention demonstrates a significant step forward in the field of vehicle maintenance tools, and more specifically in the field of wheel assembly removal tools. Many undesirable, ineffective, and unsuccessful attempts have been made to create a wheel assembly removal apparatus having the convenience and efficiency of the present invention. The preferred wheel assembly removal apparatus has wide application for all wheel based vehicles that incorporate wheel or rotating assemblies that are subject to removal for maintenance and replacement. The preferred configurations and described alternatives, modifications, and variations of the wheel assembly removal apparatus of the instant invention overcome prior shortcomings and accomplish new and novel solutions to the prior art problems with vastly improved configurations and arrangements of inventive elements that are uniquely configured, and which demonstrate previously unavailable capabilities, and wide compatibility for use with any original equipment manufacturer (OEM) vehicles.

Figure 1:
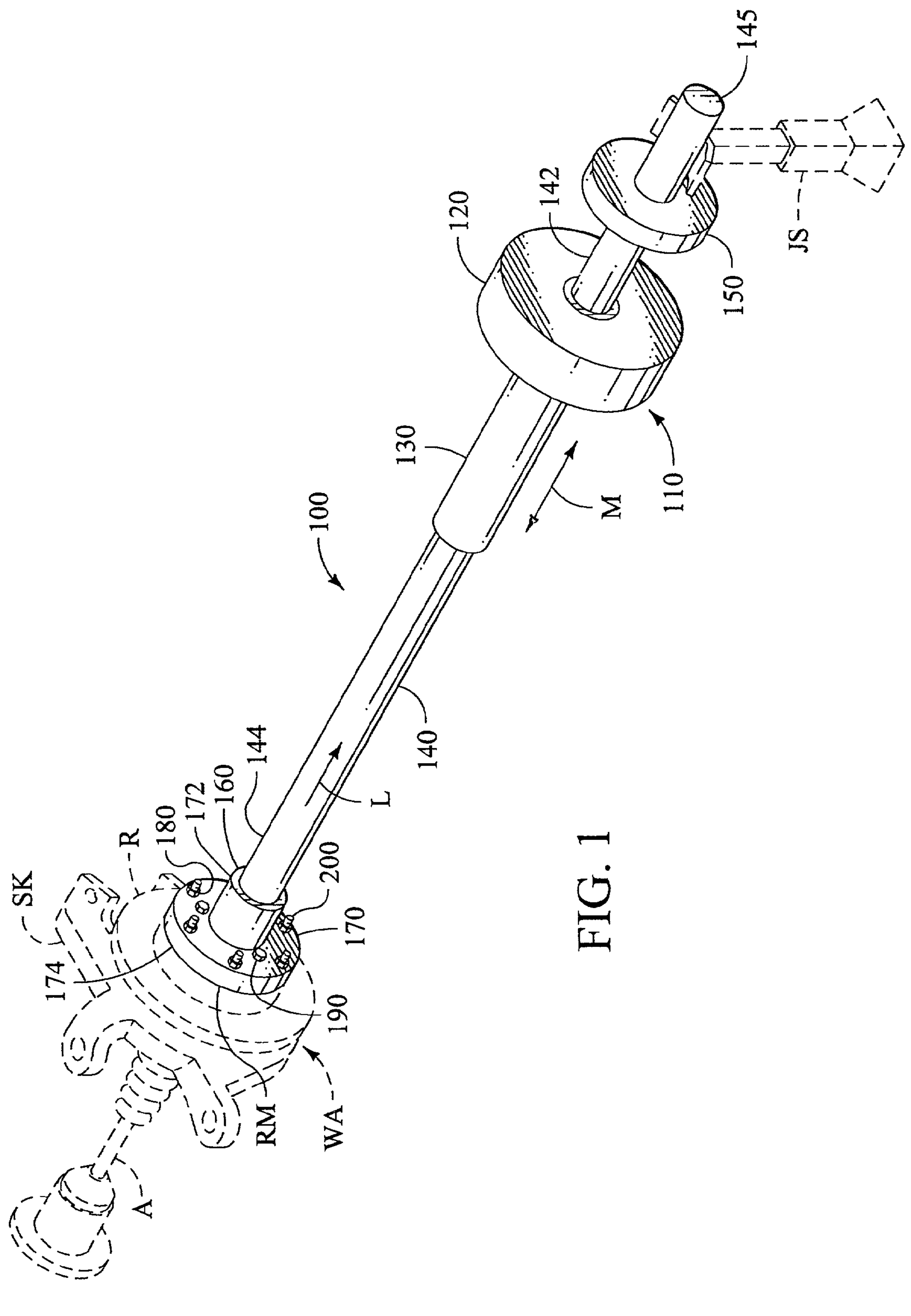
FIG. 1 is an elevation view, in reduced scale, of a wheel assembly removal apparatus according to the present invention shown attached to a wheel assembly.

With reference now to the accompanying figures and specifically to FIG. 1, in one of the many preferable configurations, the wheel assembly removal apparatus 100 incorporates, among other elements, a slide hammer assembly 110 that includes a hammer 120 secured to a hollow slide tube 130. The hollow slide tube 130 is received on a slide shaft 140 upon which the hollow slide tube 130 and hammer 120 can be moved, as indicated generally by arrows identified by reference letter M. The slide shaft 140 incorporates a hammer stop 150 near the distal end 142 and a distally projecting support extension 145. A coupler 160 is formed at the proximal end 144 of the slide shaft 140 and is configured to releasably engage an interchangeable rotor securing tool 170. The interchangeable rotor securing tool 170 releasably attaches to the coupler 160 at the distal end 172 and to a rim mounting surface RM at the proximal end 174.

In operation, a user rapidly accelerates the hammer 120 and hollow slide tube 130 to generate linear momentum, from the proximal end 144 of the slide shaft 140 to impact the hammer stop 150, which creates an operational impact load, denoted generally by the arrow identified by the reference letter L, as the hammer 120 strikes the hammer stop 150. The user may grip the hollow slide tube 130 or the hammer 120 to accelerate the hammer assembly 110. In this way, the user creates and transfers the momentum of the accelerated slide hammer assembly 110 to the wheel assembly WA. Those with skill in the art can understand that the resulting impact load is transferred through the slide shaft 140, the coupler 160, and the interchangeable rotor securing tool 170 to the rim mounting surface RM. It has been found that repeated operation of the apparatus 100 in this way can unseize and separate even the most tightly joined wheel assembly components.

One variation of the preceding embodiment includes a plurality of bearings (not shown) in the slide tube 130. The addition of such bearings reduces the friction between the slide shaft 140 and the slide tube 130. Alternatively, the slide shaft 140 may include a plurality of bearings upon which the slide tube 130 travels. Further, the slide tube 130 and slide shaft 140 may include a low friction coating.

Yet another embodiment of the apparatus 100 shown in FIG. 1 incorporates a pneumatic or hydraulic cylinder (not shown) as the slide shaft 140. A pneumatic cylinder may be used as the slide shaft 140 by simply adding a compressed air connection port at either end of the hollow slide tube 140. The modified slide shaft 140 would preferably contain a pneumatic piston that may be connected to the slide hammer assembly 110 in a number of ways recognizable by one with skill in the art. This embodiment would allow the operator to operate the apparatus 100 remotely and to stand clear of all moving components of the apparatus 100, as well as the wheel assembly WA, as it is separated.

The rim mounting surface varies with the type of OEM vehicle. Typically, in one example, in the rim mounting surface RM is either on the rotor R or the hub. One with skill in the art can recognize that the wheel assembly WA generally includes a spindle (not shown), a wheel bearing (not shown), a hub (not shown), and a rotor R. The particular wheel assembly WA depicted in FIGS. 1, 2, 3, and 4 illustrates a configuration wherein the rotor R is located on the wheel side of the hub, also the side wherein the apparatus 100 attaches in the referenced figures. However, there are other types of vehicles in which the hub is on the wheel side of the rotor R, such as late model full size Dodge brand trucks, wherein the wheel assembly removal apparatus 100 is equally effective. The impact load generated during operation of the apparatus 100 breaks loose the seized components of the wheel assembly WA, which may include, for example, wheel bearings, hub, rotor R, and axle components, from the spindle and axle A.

The apparatus 100 may be constructed out of virtually any durable and relatively strong and fatigue resistant material. One preferable embodiment utilizes commercially available carbon steel components due to the low cost of carbon steels and their durability and high strength. The apparatus may be constructed out of corrosion resistant and spark resistant materials for use in hazardous environments. Also, the various components of the apparatus 100 may be furnished in a variety of finishes, including for example a painted finish, a coated finish, a dielectric coating, a plated finish, or a galvanized coating.

The preferred embodiment is light enough that a single person can carry and set-up the apparatus 100. Additionally, a high ratio of the weight of the slide hammer assembly 110 to the apparatus 100 weight is preferred. Accordingly, a hollow slide shaft 140 and a small hammer stop 150 are preferred. In this way, the momentum of the moving slide hammer assembly 110 is transferred, on impact with the stop 150, mostly to the wheel assembly WA and energy is not unduly wasted in accelerating unnecessary mass of the apparatus 100.

Figure 2:
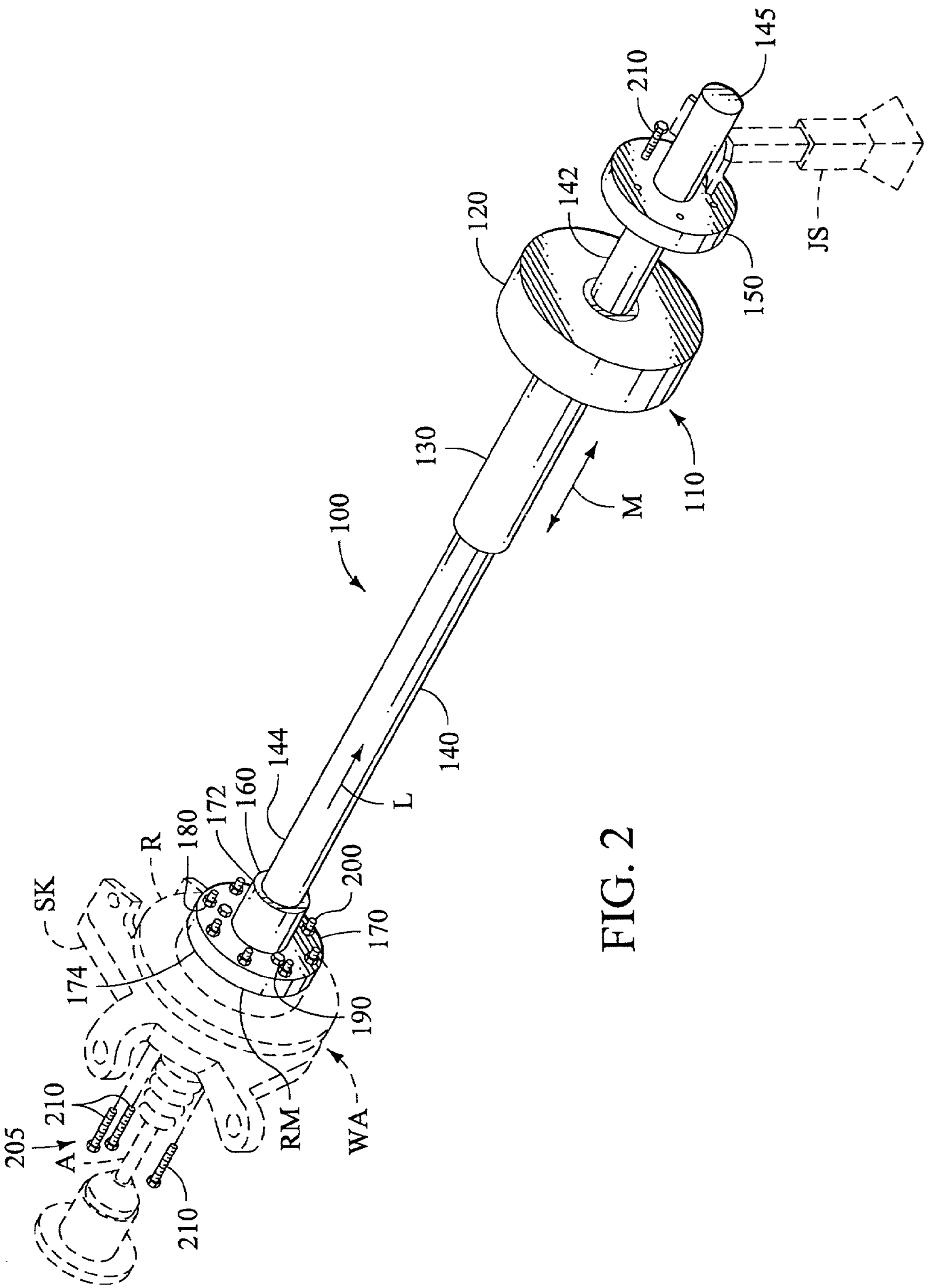
FIG. 2 is an elevation view, in reduced scale, of a variation of a wheel assembly removal apparatus of FIG. 1.
Figure 3:
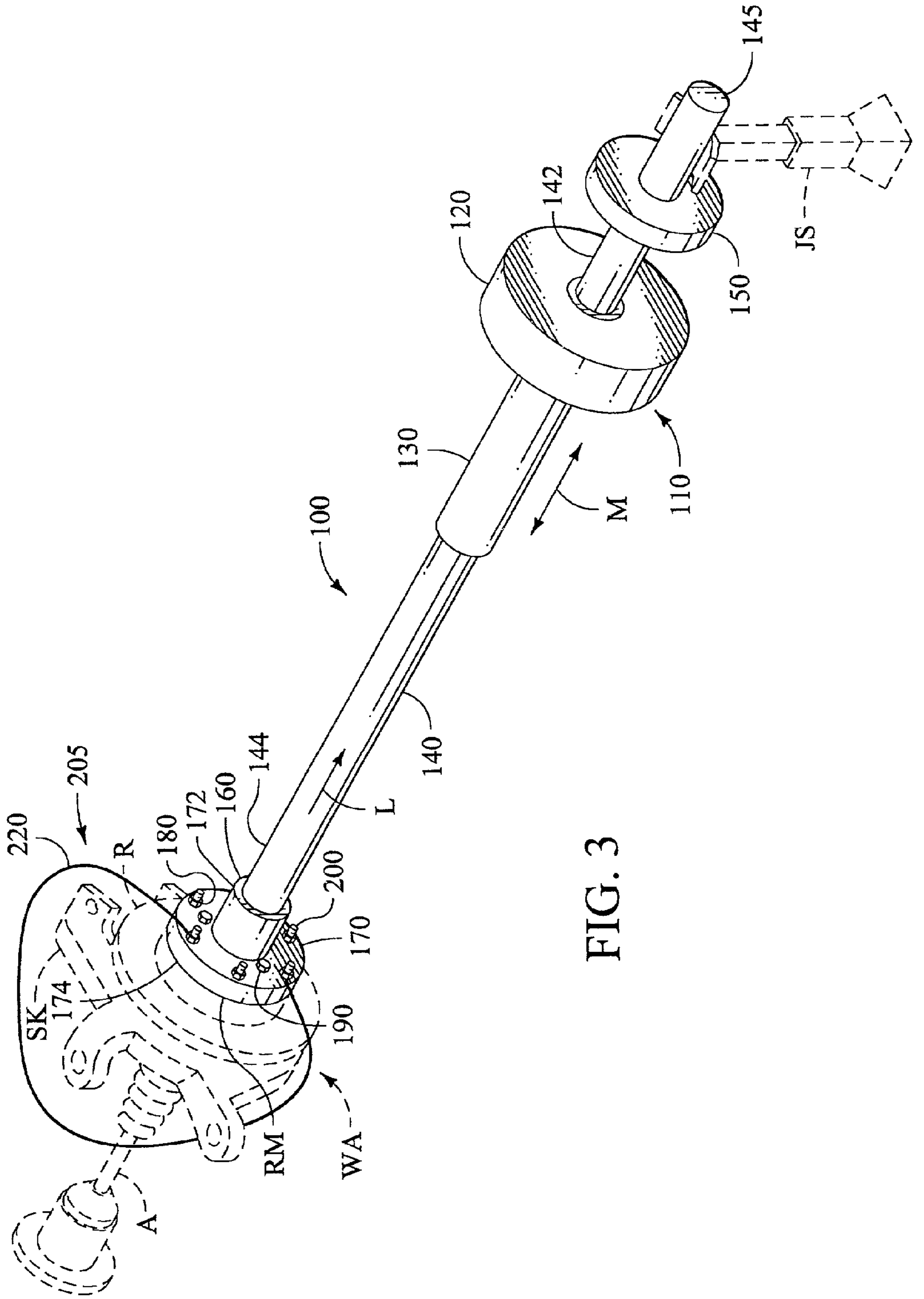
FIG. 3 is an elevation view, in reduced scale, of a modified wheel assembly removal apparatus according to the present invention shown attached to a wheel assembly.
Figure 4:
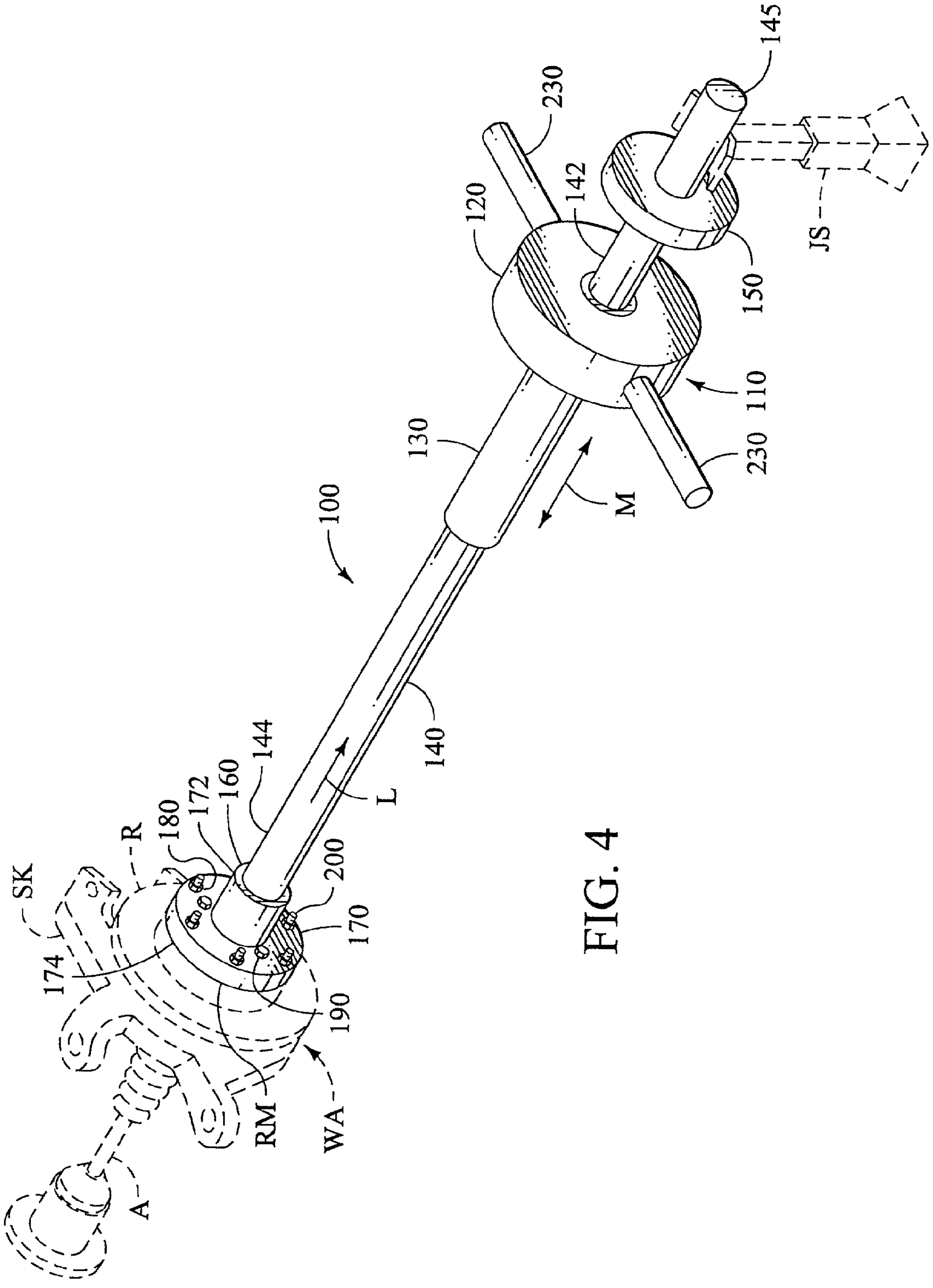
FIG. 4 is an elevation view, in reduced scale, of another variation of the wheel assembly removal apparatus according to the present invention.
Figure 2:
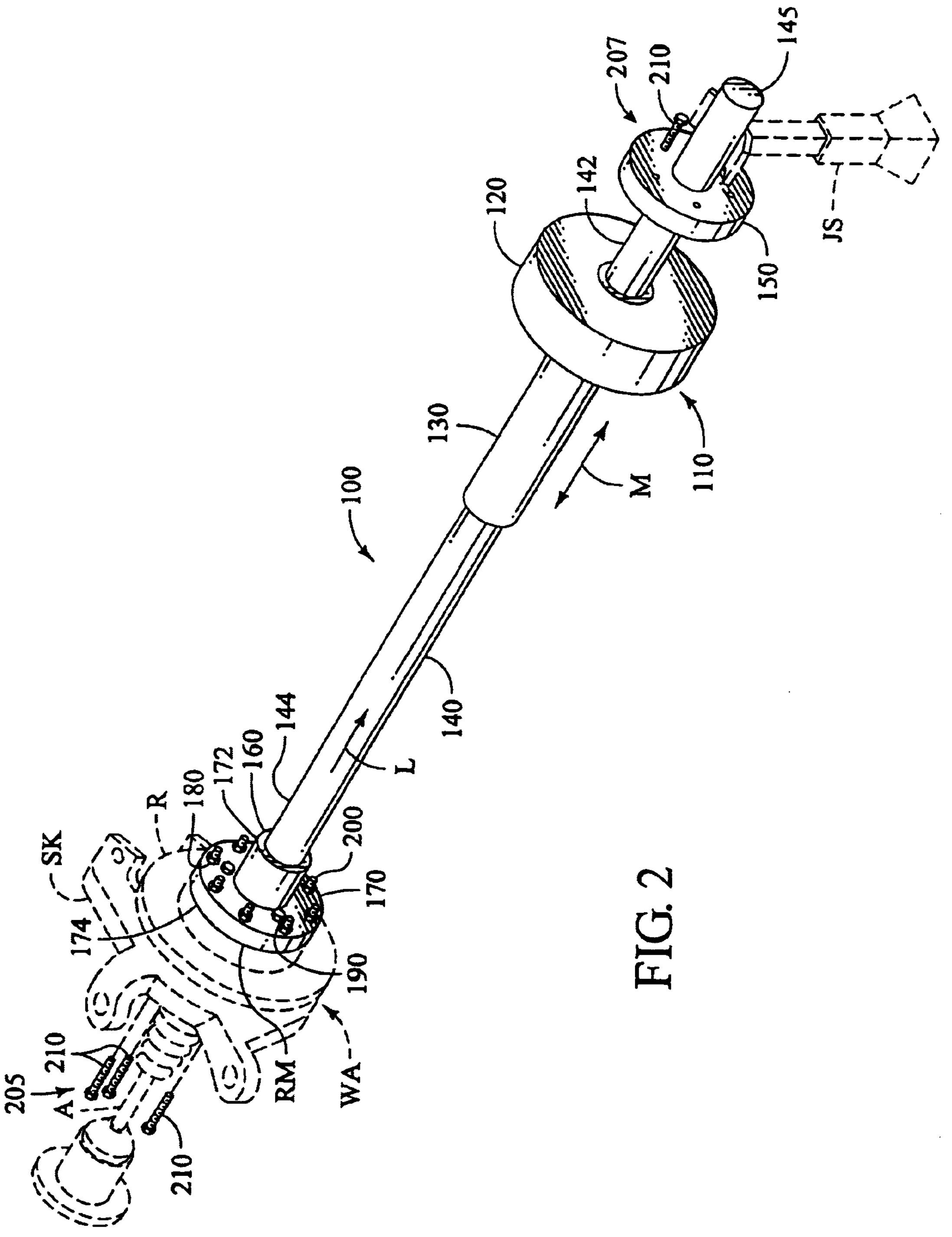

In one of many variations of the instant invention, the apparatus 100 also preferably includes a plurality of engagement hole patterns 180, each containing at least two engagement holes, formed on the interchangeable rotor securing tool 170. More specifically, one embodiment of the interchangeable rotor securing tool 170 may preferably include a four engagement hole pattern, a six engagement hole pattern, an eight engagement hole pattern on a single tool 170 and combination thereon. Alternatively, the interchangeable rotor securing tool 170 may include a three engagement hole pattern, a five engagement hole pattern, an eight engagement hole pattern on a single tool 170, and combinations thereon. Further, each of the plurality of engagement hole patterns 180 may be formed on individual interchangeable rotor securing tools 170. These engagement hole patterns 180 are not limited to aligning with engagement members 200, but may also align with the bearing removal bolt patterns of many vehicles. Referring now also to FIGS. 1, 3, and 4, additional modifications are illustrated that include a three engagement hole pattern and a six engagement hole pattern. FIG. 2 illustrates a modified embodiment that incorporates a three engagement hole pattern and an eight engagement hole pattern.

The coupler 160 is preferably adapted to enhance compatibility in that it enables a single slide hammer assembly 110 to be used with any number of interchangeable rotor securing tools 170. Therefore, one slide hammer assembly 110 may be used with any number of interchangeable rotor securing tools 170 that are adapted for both foreign and domestic vehicles, including for example, cars, trucks, vans, buses, aircraft, and recreation and military vehicles. The coupler 160 may take the form of a male threaded connection on the slide shaft 140 for engagement by a female threaded receiver on the interchangeable rotor securing tool 170. Alternatively, one with skill in the art would recognize that the coupler 160 may be formed to include quick release type fasteners, cotter pin type fasteners, bayonet fasteners, and any number of other recognized joining methods.

Additional embodiments of the interchangeable rotor securing tool 170 allow the tool to be securely connected to or coupled to the rim mounting surface to transfer a substantially axial impact load L approximately uniformly to the rim mounting surface RM. This variation may be used with any of the preceding embodiments and incorporates an interchangeable rotor securing tool 170 that is adapted to be in contact with a substantial portion of the rim mounting surface RM, in addition to engaging the engagement members 200. While it is preferably that all the engagement members 200 be fastened to the apparatus 100 to maximize the load distribution and minimize the potential for damaging the engagement members 200, the apparatus 100 can function when fastened to at least one engagement member 200. Then, with the engagement members 200 extending through at least one of the engagement hole patterns 180 and fastened to the tool 170, the slide shaft 140 is preferably approximately orthogonal to the rim mounting surface RM and will transfer a substantially axial operational impact load L. Additionally, the substantial amount of contact area of the rim mounting surface RM and the tool 170, when properly connected, ensures a substantially distributed load transfer interface for the uniform transfer of loads from the tool 170 to the rim mounting surface RM.

Further, the apparatus 100 also preferably can include a support extension 145 at the distal end of the slide shaft 140. The support extension 145 allows the operator to rest the distal end of the apparatus 100 on a jack stand JS. As described before, the operator does not have to support the weight of the apparatus 100 while in use and during setup. Additionally, with the support extension 145 on a jack stand the operator can ensure that the slide shaft 140 is substantially level, if desired, and substantially orthogonal to the rim mounting surface RM to therefore transferring the greatest amount of axial force. An additional variation of the support extension 145 may include a distal end connection for securing additional tools. The apparatus 100 may then be used as a tool to impart compressive impulse forces and may be used, for example, to unseize axles by driving them toward the transmission.

A further variation of any of the preceding embodiments may also include a dual hand operation mechanism 230, as illustrated in FIG. 4. The mechanism 230 operates best with hands of the operator grasping the moving portion of the apparatus 100, namely the hollow slide hammer assembly 110, prior to accelerating the slide hammer assembly 110 on the slide shaft 140. This mechanism 230 minimizes the possibility of the operator getting one a hand caught between the slide hammer assembly 110 and the hammer stop 150.

One embodiment of the dual hand operation mechanism includes two spring loaded handles secured to the hammer 120. A pin (not shown) extends from the handles through the hammer 120 to the slide shaft 140. In this embodiment the slide shaft 140 includes a plurality of ledges (not shown) that engage the pins. To slide the slide tube 130 and hammer 120 along the slide shaft 140, the user must place one hand on each handle and pull the handles, and therefore the pins, outward away from the slide shaft 140, therefore disengaging the pins and ledges. One with skill in the art would recognize the myriad of potential dual hand mechanisms that may be successfully applied to this apparatus in the context of the preceding descriptions.

A further variation of any of the preceding embodiments may include a non-slip gripping surface on the hollow slide tube 130, the hammer 120, and the operation mechanism 230. The surface textures may include, for example, work and grip surfaces that are also formed to have stipple and or dimple patterns of raised portions. Further, the hollow slide tube 130 and the operation mechanism 230 may include grip type devices that conform to the shape of a hand gripping a cylindrical object.

Any of the preceding configurations and embodiments may also be adapted to include any one of a number of releasably engagable retainer assemblies 205. This retainer assembly 205 loosely retains the wheel assembly WA to the vehicle chassis so that the operator, apparatus 100, and the wheel assembly WA are controlled when the impact load breaks free the seized components. The retainer assembly 205 may, in one variation, include at least one fastener. One such embodiment incorporates at least one retainer bolt 210 that loosely secures the wheel assembly WA to the vehicle chassis during operation. For example, in one of many possible applications as shown in FIG. 2, the OEM bolts that are used to tightly secure the bearing of the wheel assembly WA to the steering knuckle SK or chassis are removed and replaced with at least one fastener that may be extra long bolts, such as bolts approximately 2" to 8" long, or longer as needed, which enable the wheel assembly to break free when the impact load is applied. Further, the retainer bolts 210 restrain the wheel assembly WA and apparatus 100 to the vehicle to control the breakaway of the wheel assembly WA from the vehicle and prevent the wheel assembly WA and the apparatus from dropping to the ground. Additionally, a jack stand JS may be located under the coupler 160 to control the weight of the wheel assembly WA and the apparatus 100 when the wheel assembly WA breaks free.

Additionally, further embodiments of the releasably engagable retainer assembly 205 incorporates at least one flexible and adjustable retainer device 220, as illustrated in FIG. 3. The flexible and adjustable retainer device 220 may preferably be formed from chains, wire ropes, elastomeric restraints, bungees, and any number of strap like devices and combinations thereof. These flexible adjustable retainer devices 220 may be releasably engaged by the interchangeable rotor securing tool 170 or the slide shaft 140 and may be wrapped around and through the wheel assembly chassis mount, steering knuckle SK, or virtually any vehicle member that is securely attached to the frame.

Any of the preceding configurations and embodiments may also be adapted to include a means for attaching the releasably engagable retainer assembly 205 to the apparatus 100 when not in use. One such embodiment may include retainer bolt recesses formed into the hammer as a storage holder 207 in which the retainer bolts 210 may be secured when the apparatus is not in use, as illustrated in FIG. 2. Additional storage holder embodiments such as a storage holder 207 may include retainer bolt recesses in the hammer 120, interchangeable rotor securing tool 170, or the device support extension 145. Similar attachment means may be incorporated into the flexible adjustable retainer device 220 embodiments.

As represented in the various figures, the wheel assembly removal apparatus 100 is not necessarily shown to scale but is shown in one of many possible and equally desirable representative relative dimensional proportions, as will be apparent to those with skill in the art. For example, although the wheel assembly removal apparatus 100 is shown to have a generally cylindrical components, any of a wide variety of equally suitable profiles are available and would be compatible for purposes of and contemplated by the wheel assembly removal apparatus 100 of the present invention.

Numerous alterations, modifications, and variations of the preferred embodiments, configurations, modifications, variations, and alternatives disclosed herein will be apparent to those skilled in the art and they are all contemplated to be within the spirit and scope of the instant invention. For example, although specific embodiments have been described in detail, those with skill in the art can understand that the preceding embodiments and variations can be further modified to incorporate various types of substitute and/or additional materials, components, shapes, relative arrangement of elements, and dimensional and proportional configurations for compatibility with the wide variety of industrial, commercial, and professional vehicle maintenance service environments known to and available in the respective industries. Accordingly, even though only few variations of the present invention are described herein, it is to be understood that the practice of such additional modifications and variations and the equivalents thereof, are within the spirit and scope of the invention as defined in the following claims.

We claim:

1. An automotive wheel assembly removal apparatus adapted to be connected to a rim mounting surface of an automotive wheel assembly and operative to remove the wheel assembly from a vehicle chassis, comprising:

a slide hammer assembly for creating an operational impact load and incorporating a hammer secured to a hollow slide tube received on a slide shaft, the slide shaft having a distal hammer stop and being formed with a support extension projecting from the stop, the slide shaft also being formed at a proximal end with a coupler; and an interchangeable rotor securing tool releasably mounted to the coupler and formed with a plurality of engagement hole patterns, each of the patterns including at least two respective engagement holes that are adapted to receive at least two engagement members.

2. The apparatus according to claim 1, wherein at least one of the plurality of engagement hole patterns is selected from the group including (a) a four engagement hole pattern adapted to mate with at least one OEM component engagement pattern, (b) a six engagement hole pattern adapted to mate with at least one OEM six lug pattern, and (c) an eight engagement hole pattern adapted to mate with at least one OEM eight lug pattern.

3. The apparatus according to claim 1, wherein the interchangeable rotor securing tool is formed with a five engagement hole pattern of the plurality of engagement hole patterns and is adapted to mate with at least one OEM five lug pattern.

4. The apparatus according to claim 1, further comprising:

a dual hand operation mechanism including at least one hammer handle.

5. The apparatus according to claim 1, wherein the interchangeable rotor securing tool is adapted to be coupled to the rim mounting surface to establish a distributed load transfer interface with the automotive wheel assembly whereby the operational impact load is substantially uniformly transferred to the rim mounting surface.

6. The apparatus according to claim 1, further comprising:

a releasably engagable retainer assembly that includes at least one fastener adapted to be received by the vehicle chassis and to loosely retain the wheel assembly to the vehicle chassis during operation of the removal apparatus.

7. The apparatus according to claim 6, wherein the at least one fastener is selected from the group including a retainer bolt, an expandable bolt, a locking shear pin, a flexible strap, and combinations thereof.

8. The apparatus according to claim 6, wherein the at least one fastener includes at least one flexible and adjustable retainer device.

9. The apparatus according to claim 6, including at least one storage holder for storing the retainer assembly during non use.

10. An automotive wheel assembly removal apparatus adapted to be connected to a rim mounting surface of an automotive wheel assembly and operative to remove the wheel assembly from a vehicle chassis, comprising:

a slide hammer assembly for creating an operational impact load and incorporating a hammer secured to a hollow slide tube received on a slide shaft, the slide shaft having a distal hammer stop and being formed with a support extension projecting from the stop, the slide shaft also being formed at a proximal end with a coupler;

a dual hand operation mechanism including at least one hammer handle secured to the slide hammer assembly;

an interchangeable rotor securing tool releasably mounted to the coupler and formed with a plurality of engagement hole patterns, each of the patterns including at least two respective engagement holes that are adapted to receive at least two engagement members; and a releasably engagable retainer assembly that includes at least one fastener adapted to be received by the vehicle chassis and to loosely retain the wheel assembly during removal from the vehicle chassis.

11. The apparatus according to claim 10, wherein at least one of the plurality of engagement hole patterns is selected from the group including (a) a four engagement hole pattern adapted to mate with at least one OEM component engagement pattern, (b) a six engagement hole pattern adapted to mate with at least one OEM six lug pattern, and (c) an eight engagement hole pattern adapted to mate with at least one OEM eight lug pattern.

12. The apparatus according to claim 10, wherein the interchangeable rotor securing tool is formed with a five engagement hole pattern of the plurality of engagement hole patterns and is adapted to mate with at least one OEM five lug pattern.

13. The apparatus according to claim 10, wherein the interchangeable rotor securing tool is adapted to be coupled to the rim mounting surface to establish a distributed load transfer interface with the automotive wheel assembly whereby the operational impact load is substantially uniformly transferred to the rim mounting surface.

14. The apparatus according to claim 10, wherein the at least one fastener is selected from the group including a retainer bolt, an expandable bolt, a locking shear pin, a flexible strap, and combinations thereof.

15. The apparatus according to claim 10, wherein the at least one fastener includes at least one flexible and adjustable retainer device.

16. The apparatus according to claim 10, including at least one storage holder for storing the retainer assembly during non use.

17. A means for removing an automotive wheel assembly from a vehicle chassis, comprising:

a means for generating linear momentum;

a means for slidably receiving the momentum generating means;

a means for linearly transferring the momentum of the momentum generating means to the receiving means, the transferring means being formed at a distal end of the receiving means;

a means for supporting the receiving means projecting distally from the transferring means;

a means for proximally coupling the receiving means and being carried therefrom;

an interchangeable means for imparting the linear momentum to the wheel assembly, the interchangeable means being releasably attached to the coupling means; and a means for releasably retaining the removing means to the wheel assembly during operation.

18. A means for removing an automotive wheel assembly from a vehicle chassis according to claim 17, wherein the interchangeable means is further formed to include a means for engagingly mating with at least one respective OEM component engagement pattern.

19. A means for removing an automotive wheel assembly from a vehicle chassis according to claim 17, wherein the linear momentum generating means is further formed to include a means for facilitating hand operation of the linear momentum generating means.

20. A means for removing an automotive wheel assembly from a vehicle chassis according to claim 17, wherein the interchangeable means is adapted to establish a distributed load transfer interface with the automotive wheel assembly whereby a substantial portion of the linear momentum is uniformly transferred to the wheel assembly.

21. A means for removing an automotive wheel assembly from a vehicle chassis according to claim 17, wherein the releasably retaining means includes at least one means for fastening adapted to be received by a vehicle chassis and to loosely retain the wheel assembly to the vehicle chassis during removal.

22. A means for removing an automotive wheel assembly from a vehicle chassis according to claim 21, wherein the at least one means for fastening is selected from the group including a retainer bolt, an expandable bolt, a locking shear pin, a flexible strap, and combinations thereof.

23. A means for removing an automotive wheel assembly from a vehicle chassis according to claim 21, wherein the at least one means for fastening includes at least one flexible and adjustable retainer device.

24. A means for removing an automotive wheel assembly from a vehicle chassis according to claim 17, further including a storage means for storing the releasably retaining means during non-use.

* * * * *

UNITED STATES PATENT AND TRADEMARK OFFICE

CERTIFICATE OF CORRECTION

PATENT NO. : 6,971,149 B2
APPLICATION NO. : 10/027371
DATED : December 6, 2005
INVENTOR(S) : Bergman et al.

It is certified that error appears in the above-identified patent and that said Letters Patent is hereby corrected as shown below:

On Title Page, col. 1 See Item (12) United States Patent, and Item (75) Inventors: “Berman et al.” should read -- Bergman et al. --

See FIG. 2, replace the current FIG. 2 with corrected FIG. 2 attached which shows element number 207.

Signed and Sealed this

Seventeenth Day of October, 2006

JON W. DUDAS

*Director of the United States Patent and Trademark Office*